United States Patent [19]
Fukuda et al.

[11] Patent Number: 5,312,690
[45] Date of Patent: May 17, 1994

[54] SELF-ADHESIVE SILICONE RUBBER COMPOSITION AND SILICONE RUBBER COATED-FABRIC MATERIAL

[75] Inventors: Takeshi Fukuda; Shiniti Ide, both of Gunma; Motoo Fukushima, Kanagawa, all of Japan

[73] Assignee: Shin-Etsu Chemical Co., Ltd., Tokyo, Japan

[21] Appl. No.: 944,630

[22] Filed: Sep. 14, 1992

Related U.S. Application Data

[62] Division of Ser. No. 622,572, Dec. 5, 1990, abandoned.

[30] Foreign Application Priority Data

Dec. 5, 1989 [JP] Japan .................................. 1-315585

[51] Int. Cl.$^5$ .......................... B32B 9/04; C08G 77/26
[52] U.S. Cl. ....................................... 428/447; 528/34; 528/32; 528/31; 528/24; 528/15
[58] Field of Search ................. 428/447; 528/34, 15, 528/31, 32, 24

[56] References Cited

U.S. PATENT DOCUMENTS

| | | | |
|---|---|---|---|
| 3,170,891 | 2/1965 | Speier | 556/414 |
| 3,453,243 | 7/1969 | Hartlein | 556/414 |
| 3,813,364 | 5/1974 | Zuba et al. | 260/37 SB |
| 4,308,071 | 12/1981 | Gervase | 106/193 J |
| 5,006,372 | 4/1991 | Wolfer et al. | 427/387 |

FOREIGN PATENT DOCUMENTS

| | | |
|---|---|---|
| 2132797 | 4/1972 | France . |
| 2137217A | 3/1983 | United Kingdom . |
| 86/05798 | 10/1986 | World Int. Prop. O. . |

*Primary Examiner*—Melvyn I. Marquis
*Assistant Examiner*—Margaret W. Glass
*Attorney, Agent, or Firm*—Millen, White, Zelano & Branigan

[57] ABSTRACT

A novel self-adhesive silicone rubber composition is disclosed which gives a cured silicone rubber capable of being firmly bonded to the surface of various kinds of substrate materials even without the pre-treatment of the substrate surface with a primer so that the composition is useful as a coating material in the preparation of a silicone rubber-coated cloth advantageous in respect of the firm adhesion of the cured silicone rubber layer to the substrate cloth. The composition is characterized by the formulation of a unique component which is an organosilane compound having an isocyanato-containing group and a hydrolyzable group in a molecule such as 3-isocyanatopropyl trimethoxy silane.

8 Claims, No Drawings

SELF-ADHESIVE SILICONE RUBBER COMPOSITION AND SILICONE RUBBER COATED-FABRIC MATERIAL

This is a division of application Ser. No. 07/622,572 filed Dec. 5, 1990, now abandoned.

BACKGROUND OF THE INVENTION

The present invention relates to a self-adhesive silicone rubber composition or, more particularly, to a silicone rubber composition capable of firmly adhering to the surface of various kinds of substrate materials such as metals, glass, ceramics, plastics, fibers, rubbers and the like even without the pre-treatment of the surface with a primer as well as to a silicone rubber-coated fabric web prepared by coating a fabric web with the silicone rubber composition and curing the same.

Silicone rubber compositions in general have surface-releasability more or less so that firm adhesive bonding usually cannot be obtained between a cured silicone rubber composition and the surface of a substrate material, such as metals, glass, ceramics, plastics, fibers and fabric webs, rubbers and the like, on which the silicone rubber composition has been cured. This disadvantage can be solved at least partly by treating the substrate surface with a so-called primer before the substrate surface is contacted with an uncured silicone rubber composition.

On the other hand, silicone rubber-coated fabric webs, i.e. woven cloths, knit cloths and non-woven cloths, are prepared by coating a fabric web with a silicone rubber composition and curing the silicone rubber composition so as to have the silicone rubber composition cured on and firmly adhering to the substrate surface. Such a silicone rubber-coated fabric web is widely used as an electric insulating material, diaphragms, sealing material, material of air bags, tenting sheet, duct hose and the like. Proposals have been made in Japanese Patent Publication No. 42-2687 and Japanese Patent Kokai No. 55-152863 for the use of a silicone rubber-coated fabric web as a material of medical use or clothing use. A problem in these silicone rubber-coated fabric webs is that firm adhesive bonding can hardly be obtained between the cured silicone rubber layer and the surface of the fabrics as the substrate, in particular, when the fabric web is formed from synthetic fibers having polar groups such as amide groups of the formula —CO—NH— as is the case in nylons, aromatic polyamide fibers and the like.

The treatment with a primer is indeed effective in improving the adhesive bonding between a cured silicone rubber composition and various kinds of substrate surfaces. Practically, however, the primer treatment has several disadvantages as an industrial process even by setting aside the troublesomeness of the molding process which must be preceded by the primer treatment. Since primers are usually used in the form of a solution in an organic solvent, for example, vapor of the organic solvent causes a serious problem of environmental pollution necessitating expensive facilities for ventilation along with an adverse influence on the health of workers. When a strong shearing force is added to the primer-coated substrate surface as in the injection molding, in addition, the primer layer sometimes causes a plastic flow eventually to be removed from the substrate surface leading to an uneven priming effect.

In this regard, so-called self-adhesive silicone rubber compositions have been developed which can be cured into a cured silicone rubber firmly adhering to the substrate surface on which the composition has been cured even by omitting the primer treatment of the substrate surface. Self-adhesive silicone rubber compositions of a class are prepared by admixing a silicone rubber composition with an alkylperoxy silane compound as an adhesiveness-imparting agent including, for example, vinyl tris(tert-butylperoxy) silane, triphenyl tert-butylperoxy silane, trimethyl tert-butylperoxy silane, methyl vinyl di(tert-butylperoxy) silane and the like. Further, it is known that a silicone rubber composition can be imparted with self-adhesiveness by the admixture of a so-called carbon-functional silane coupling agent such as vinyl trimethoxy silane, vinyl triethoxy silane, 3-glycidyloxypropyl trimethoxy silane, 3-methacryloxypropyl trimethoxy silane and the like. It is also known that a benzoate compound having a vinyl-substituted silyl group such as tert-butylperoxy-4-vinyl dimethylsilyl benzoate and the like serves simultaneously as an adhesiveness-imparting agent and as a curing agent since the compound is an organic peroxide.

The above described silicone rubber compositions are not quite satisfactory as a self-adhesive rubber composition. For example, the alkylperoxy silane compounds cannot impart the silicone rubber composition with sufficiently high self-adhesiveness. The silicone rubber composition compounded with a silane coupling agent is also not quite satisfactory in respect of the self-adhesiveness and the durability of adhesive bonding. The benzoate compound is practically not advantageous in respect of the cost for the compound due to the difficulty in the synthetic preparation thereof as well as in respect of the low durability of the adhesive bonding at an elevated temperature between the substrate surface and the cured silicone rubber layer prepared by the admixture of the same.

SUMMARY OF THE INVENTION

The present invention accordingly has an object to provide a self-adhesive silicone rubber composition freed from the above described problems and disadvantages in the prior art silicone rubber compositions as well as a silicone rubber-coated fabric web e.g., woven and knit cloths and non-woven fabrics, coated with the silicone rubber composition.

The self-adhesive silicone rubber composition of the invention is a uniform blend which comprises:

(a) 100 parts by weight of an organopolysiloxane represented by the average unit formula $$R_aSiO_{(4-a)/2}, \tag{I}$$ 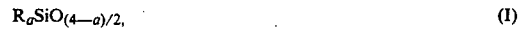

in which R is an unsubstituted or substituted monovalent hydrocarbon group and the subscript a is a positive number in the range from 1.98 to 2.01, and having a viscosity of at least 300 centistokes at 25° C.;

(b) from 0.1 to 20 parts by weight of an organosilane compound having, in a molecule, an isocyanato group —NCO and a hydrolyzable group or a partial hydrolysis product thereof; and (c) a curing agent in an amount sufficient to cure the composition.

Further, the silicone rubber-coated fabric web is a sheet material consisting of a fabric web and a cured layer of the above defined self-adhesive silicone rubber composition coating and firmly adhering to at least one surface of the fabric web.

DETAILED DESCRIPTION OF THE PREFERRED EMBODIMENTS

As is understood from the above given description, the inventive self-adhesive silicone rubber composition comprises the three essential components (a), (b) and (c), of which the most characteristic ingredient is the component (b) which is an organosilane compound having, in a molecule, an isocyanato group —NCO and a hydrolyzable group such as alkoxy groups. By virtue of the addition of this unique ingredient, the inventive silicone rubber composition as cured firmly adheres to the surface of various kinds of substrate materials on which the rubber composition has been cured. In particular, excellent adhesive bonding can be obtained between the silicone rubber composition as cured and a fabric web of various kinds of synthetic fibers so that silicone rubber-coated fabric webs prepared by using the inventive silicone rubber composition exhibit excellent durability of the adhesively bonded coating layer even at an elevated temperature.

The component (a) comprised in the inventive silicone rubber composition is an organopolysiloxane represented by the average unit formula (I) given above. In the formula, R is an unsubstituted or substituted monovalent hydrocarbon group exemplified by alkyl groups such as methyl, ethyl, propyl, butyl and hexyl groups, cycloalkyl groups such as cyclohexyl group, alkenyl groups such as vinyl and allyl groups and aryl groups such as phenyl and tolyl groups as well as those substituted groups obtained by replacing a part or all of the hydrogen atoms in the above named hydrocarbon groups with halogen atoms, cyano groups and the like such as chloromethyl, 2-cyanoethyl and 3,3,3-trifluoropropyl groups. Two kinds or more of different groups among the above can be contained in a molecule of the organopolysiloxane. It is preferable, however, that at least 50% by moles or, more preferably, at least 80% by moles of the organic groups denoted by R in the organopolysiloxane are methyl groups in order that the advantageous properties of a silicone rubber can be fully exhibited along with a decreased cost for the organopolysiloxane. The subscript a in the average unit formula (I) is a positive number in the range from 1.98 to 2.01. This limitation means that the organopolysiloxane should have a substantially linear molecular structure of a diorganopolysiloxane although a small amount of a branched structure can be contained therein. The organopolysiloxane as the component (a) should have a viscosity of at least 300 centistokes at 25° C. When the viscosity of the organopolysiloxane is too low with an unduly small molecular weight, the composition compounded therewith cannot give a cured silicone rubber having sufficiently high mechanical properties suitable as a coating layer of a silicone rubber-coated fabric web. Preferably, the viscosity of the organopolysiloxane is at least 10,000 centistokes at 25° C. The type of the terminal groups at the molecular chain ends of the organopolysiloxane is not particularly limitative and any conventional groups such as silanolic hydroxy group, methyl group, vinyl group and the like can be bonded to the terminal silicon atoms. It is preferable, in particular, that the terminal group of the molecular chain end is a trivinylsilyl group. Such an organopolysiloxane is a well known material in the art of silicones and can be obtained by several conventional methods including the ring-opening polymerization of an oligomeric cyclic poly(diorganosiloxane) such as octamethyl cyclotetrasiloxane in the presence of an acid or alkali catalyst.

The organosilane compound as the component (b) in the inventive composition contains an isocyanato group —NCO and a hydrolyzable group in a molecule. The organosilane compound is represented by the general formula $$R^1_b Si(OR^1)_{3-b}(R^2—NCO),$$ (II)

in which $R^1$ is a monovalent hydrocarbon group exemplified by alkyl groups, e.g., methyl, ethyl, propyl and butyl groups, cycloalkyl groups, e.g., cyclohexyl group, alkenyl groups, e.g., vinyl and allyl groups, aryl groups, e.g., phenyl and tolyl groups, and aralkyl groups, e.g., 2-phenylethyl group, or an alkoxy-substituted alkyl group, e.g., methoxy methyl, ethoxy methyl and 2-methoxy ethyl groups. In particular, the hydrolyzable group expressed by $OR^1$ includes alkoxy, alkenyloxy, aryloxy, alkoxy-substituted alkoxy and aralkyloxy groups. The group denoted by $R^2$ in the general formula (II) is a divalent hydrocarbon group having 1 to 10 carbon atoms exemplified by alkylene groups such as methylene, ethylene and propylene groups and arylene groups such as phenylene group. These divalent groups can contain a sulfur atom between two carbon atoms forming a sulfide linkage as in the group of the formula —$(CH_2-)_2$—S—$(-CH_2-)_3$—. The subscript b in the general formula (II) is zero, 1 or 2. The component (b) can be a partial hydrolysis product of the above defined hydrolyzable organosilane compound either alone or a combination of two kinds or more. Further, the component (b) can be a partial co-hydrolysis product of one or more of the above defined silane compounds with other hydrolyzable organosilane compounds having no isocyanato group such as dialkyl dialkoxy silanes, alkyl trialkoxy silanes and the like.

Particular examples of the organosilane compounds suitable as the component (b) in the inventive composition include those expressed by the following structural formulas, in which the symbols Me, Et, Vi and Ph denote methyl, ethyl, vinyl and phenyl groups, respectively:

$(MeO)_3Si(C_3H_6—NCO)$; $(EtO)_3Si(C_3H_6—NCO)$;

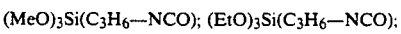

$(CH_2=CMe—O)_3Si(C_3H_6—NCO)$;

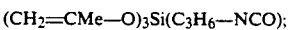

$(MeOC_2H_4O)_3Si(C_3H_6—NCO)$;
$(MeO)_2MeSi(C_3H_6—NCO)$;

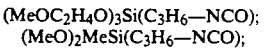

$(MeO)_2ViSi(C_3H_6—NCO);(MeO)_2PhSi(C_3H_6—NCO)$;

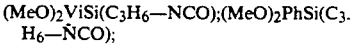

$(EtO)_2MeSi(C_3H_6—NCO)$;
$(MeO)_3Si(C_2H_4—S—C_3H_6—NCO)$;

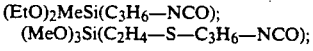

and $(MeO)_2MeSi(C_2H_4—S—C_3H_6—NCO)$.

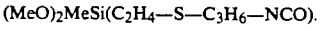

Some of them are available as a commercial product sold under the tradenames of, for example, KBM 9007, KBE 9007, KBM 9207, KBE 9207 and the like (products by Shin-Etsu Chemical Co.).

The amount of the above described organosilane compound as the component (b) in the inventive composition is in the range from 0.1 to 20 parts by weight or, preferably, from 0.5 to 10 parts by weight per 100 parts by weight of the organopolysiloxane as the component (a). When the amount of the component (b) in the composition is too small, sufficiently high adhesive bonding strength cannot be obtained between the cured composition and the substrate surface. When the amount of the component (b) is too large, on the other hand, the cured silicone rubber obtained from the composition would be poor in respect of the properties such as tensile strength, elongation, heat resistance and the like.

The component (c) in the inventive silicone rubber composition is a curing agent of the silicone rubber and various kinds of conventional curing agents can be used here without particular limitations including organic peroxides. When two or more of alkenyl, e.g., vinyl, groups are bonded to the silicon atoms in a molecule of the organopolysiloxane as the component (a), in particular, the curing agent as the component (c) can be a combination of an organohydrogenpolysiloxane having, in a molecule, at least three silicon-bonded hydrogen atoms and a trace amount of a platinum compound as a catalyst so that the organopolysiloxane as the component (a) can be crosslinked by the so-called hydrosilation reaction or addition reaction with the organohydrogenpolysiloxane as a crosslinking agent and the platinum compound as a catalyst to promote the reaction leading to curing of the composition.

Examples of the organic peroxide suitable as the component (c) include benzoyl peroxide, 2,4-dichlorobenzoyl peroxide, 2-chlorobenzoyl peroxide, di-tert-butyl peroxide, dicumyl peroxide, tert-butyl perbenzoate, tert-butyl peracetate, 2,5-dimethyl-2,5-di(tert-butylperoxy) hexane, tert-butylperoxy myristyl carbonate and the like. The amount of these organic peroxide contained in the inventive silicone rubber composition is usually in the range from 0.1 to 5 parts by weight per 100 parts by weight of the organopolysiloxane as the component (a).

The organohydrogenpolysiloxane used as a crosslinking agent of the vinyl-containing organopolysiloxane as the component (a) is represented by the average unit formula

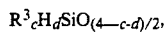

in which $R^3$ is an alkyl group such as methyl group and the subscripts c and d are each a positive number with the proviso that $c+d$ is in the range from 1.0 to 3.0. The organohydrogenpolysiloxane should have at least three hydrogen atoms directly bonded to the silicon atoms in a molecule. The amount of the organohydrogenpolysiloxane should be such that from 0.5 to 5.0 moles of the silicon-bonded hydrogen atoms are provided per mole of the alkenyl groups in the organopolysiloxane as the component (a). The platinum compound used as the catalyst to promote the hydrosilation reaction is exemplified by chloroplatinic acid, complexes thereof with an olefin or a vinyl-containing organopolysiloxane and alcoholic solutions of chloroplatinic acid. The amount of the platinum compound is in the range from 0.5 to 500 ppm by weight or, preferably, from 2 to 200 ppm by weight calculated as platinum based on the amount of the alkenyl-containing organopolysiloxane as the component (a).

The self-adhesive silicone rubber composition of the invention can be prepared by uniformly blending the above described essential components (a), (b) and (c) each in a specified amount. It is, however, optional that various kinds of known additives are added according to need. For example, various kinds of fine particulate or fibrous fillers can be admixed with an object to improve the workability of the uncured composition in the coating works of a fabric web by adequately increasing the consistency of the composition and to improve the mechanical properties of the cured silicone rubber such as hardness, tensile strength and ultimate elongation as well as the adhesive bonding strength. Examples of suitable fillers include fumed silica fillers, precipitated silica fillers, fine quartz powder, diatomaceous earth, hollow glass spheres, iron oxide, zinc oxide, titanium dioxide, magnesium oxide, talc, aluminum silicate, alumina, calcium carbonate, carbon black, asbestos, glass fibers, carbon fibers, polyester fibers, powders of synthetic resins such as polytetrafluoroethylene and polyvinyl chloride and the like. Powders of an organopolysiloxane resin are also suitable. These fillers should have a particle diameter or fiber diameter not exceeding 50 $\mu$m. The amount of these fillers in the inventive silicone rubber composition, when added, is in the range up to 200 parts by weight per 100 parts by weight of the organopolysiloxane as the component (a).

Other optional additives include so-called silane coupling agents such as 3-glycidyloxypropyl trimethoxy silane, 3-mercaptopropyl trimethoxy silane, 3-aminopropyl trimethoxy silane, vinyl trialkoxy silanes and the like, metal salts of carboxylic acids, titanate esters, chloroplatinic acid, heat-resistance improvers, flame retardants, dispersing aids and the like.

When the silicone rubber composition of the invention is used as a coating material for the manufacture of silicone rubber-coated fabric webs, it is sometimes advantageous that the composition is admixed with a suitable amount of an organic solvent in order to be imparted with a consistency suitable for the coating works. It should be noted that the organic solvent used here should have no active hydrogen atoms having reactivity with the isocyanato groups in the organosilane compound as the component (b). In this regard, the organic solvent is selected preferably from hydrocarbon solvents such as benzene, toluene, xylene, hexane, heptane, kerosene and the like. The amount of the organic solvent of course depends on the desired consistency of the composition used in the coating works. It is usual, however, that 100 parts by weight of the inventive composition are admixed with an organic solvent in an amount in the range up to 1000 parts by weight or, in most cases, from 50 to 300 parts by weight.

The self-adhesive silicone rubber composition of the invention prepared in the above described manner can be cured and adhesively bonded to the surface of various kinds of substrate materials when the composition is contacted with the substrate surface and brought under curing conditions. The adhesive bonding here obtained is very firm as a consequence of the addition of the unique component (b).

Examples of the substrate materials to which the cured silicone rubber of the inventive composition can be bonded by adhesion include metals such as iron, steels, stainless steels, aluminum, nickel, copper, chromium and the like, ceramic materials such as glass, fused quartz glass, porcelains and the like, synthetic resins such as epoxy resins, acrylic resins, polyethylene terephthalate resins, unsaturated polyester resins, polyamide resins, polybutylene terephthalate resins and the like, fabric materials of natural and synthetic fibers such as cotton, wool, nylon fibers, polyester fibers, formalized polyvinyl alcohol fibers, polyurethane fibers and the like, natural and synthetic rubbers and so on. In particular, excellent adhesive bonding can be obtained between the cured silicone rubber of the inventive composition and various kinds of synthetic fibers such as nylon fibers, polyamide fibers, polyurethane fibers and the like so that the inventive silicone rubber composition is useful as a coating material in the manufacture of silicone rubber-coated fabric webs of these fibers.

The coating works in the manufacture of silicone rubber-coated fabric webs with the inventive composition can be performed by any conventional methods including calendering, knife coating, brush coating, dip coating, spray coating and the like without particular limitations. When the composition has a consistency of solid or semi-solid, calendering is suitable for the coating work. When the coating composition has a flowable consistency, suitable coating methods include knife coating, brush coating, dip coating and spray coating.

The curing conditions of the inventive silicone rubber composition depend on the mechanisms of curing or the type of the curing agent admixed therein. For example, the composition compounded with an organic peroxide as the curing agent can be cured by the hot air vulcanization at a temperature of 150° to 550° C. for several seconds to 20 minutes depending on the temperature or by the compression molding at 110° to 180° C. for 3 to 15 minutes. When the curing agent is a combination of an organohydrogenpolysiloxane and a platinum catalyst, the composition can be cured by the hot air vulcanization at 100° to 400° C. for several seconds to 20 minutes, by the transfer molding or by the compression molding at 100° to 200° C. for 30 seconds to 10 minutes.

The silicone rubber-coated fabric webs prepared by using the inventive silicone rubber composition as the coating material exhibits excellent performance in respect of the adhesive bonding strength of the coating layer of the cured silicone rubber as well as durability of the adhesive bonding thereof so that the silicone rubber-coated fabric webs are useful in a wide field of applications such as electric insulating materials and the like.

In the following, examples and comparative examples are given to illustrate the inventive silicone rubber composition in more detail. In the description below, the term of "parts" always refers to "parts by weight" and the values of viscosity are all those obtained by the measurement at 25° C. The values of the adhesive bonding strength are the results of the measurement according to the procedure specified in JIS K 6301.

EXAMPLE 1

A uniform organopolysiloxane-based composition, referred to as the compound A hereinbelow, was prepared by mixing, in a kneader mixer, 100 parts of a methyl vinyl polysiloxane having a viscosity of 5,000,000 centistokes and consisting of 99.8% by moles of dimethyl siloxane units and 0.2% by moles of methyl vinyl siloxane units with 40 parts of a fumed silica filler having a specific surface area of 200 $m^2/g$ and hydrophobilized on the surface by blocking with trimethyl silyl groups and 2 parts of an α,ω-dihydroxy dimethyl polysiloxane having a viscosity of 20 centistokes followed by a heat treatment at 160° C. for 2 hours.

In the next place, 100 parts of this compound A were admixed, on a two-roller mill, with 1.0 part of 3-isocyanatopropyl trimethoxy silane of the formula $(CH_3O)_3Si(CH_2)_3NCO$ as an isocyanato group-containing organosilane compound and 0.5 part of 2,5-dimethyl-2,5-di(tert-butylperoxy) hexane as a curing agent to give a uniform curable composition.

The thus prepared curable silicone rubber composition was cured by compression molding at 165° C. for 10 minutes under a pressure of 20 $kgf/cm^2$ as being sandwiched between a pair of stainless steel, steel, polyester resin or glass fiber-reinforced epoxy resin panels and the adhesive bonding strength between the cured silicone rubber and the substrate surface was determined to give the values of 8.5, 8.8, 10.3 and 7.5 $kgf/cm^2$, respectively.

EXAMPLES 2 to 4 AND COMPARATIVE EXAMPLE 1

Each a 100 parts portion of the compound A prepared in Example 1 was dispersed in 233 parts of toluene together with 1 part, 3 parts or 5 parts of 3-isocyanatopropyl triethoxy silane and 1.8 parts of 2,4-dichlorobenzoyl peroxide to give three coating compositions for Examples 2, 3 and 4, respectively. In comparative Example 1, another coating composition was prepared in the same formulation as above excepting omission of the isocyanato group-containing organosilane compound. The solid content in each of these coating compositions was about 30% by weight.

A plain-woven cloth of 840 denier 6,6-nylon fibers was coated with one of these coating compositions in a coating thickness of 0.1 mm as dried and the toluene as the solvent was removed first by air drying at room temperature for 30 minutes and then by heating at 50° C. for 5 minutes followed by a heat treatment at 180° C. for 5 minutes to give a test sample of a silicone rubber-coated cloth.

Two sheets of the thus prepared test sample were adhesively bonded with the silicone rubber-coated surfaces facing inside by applying a room temperature-curable pasty silicone rubber composition (KE 45RTV, a product by Shin-Etsu Chemical Co.) to the surfaces and keeping the bonded sheets at room temperature for 72 hours to prepare a specimen for adhesion test.

The test specimen, either as prepared or after aging for 72 hours at 80° C. in an atmosphere of 95% relative humidity, was subjected to the adhesion test by pulling the rubber-coated sheets in just opposite directions to be separated. The adhesive bonding strengths obtained in this test are shown in Table 1 below.

TABLE 1

| Isocyanato group-containing silane, parts | | 0 | 1 | 3 | 5 |
|---|---|---|---|---|---|
| Adhesive bonding strength, kgf/25 mm | As prepared | 0.5 | 8.5 | 10.0 | 9.5 |
| | After aging | — | 5.0 | 8.5 | 9.0 |

EXAMPLES 5 and 6 AND COMPARATIVE EXAMPLES 2 TO 5.

A uniform organopolysiloxane-based composition, referred to as the compound B hereinbelow, was prepared by blending and heating at 180° C. for 2 hours in a kneader, 100 parts of an organopolysiloxane having a viscosity of about $1 \times 10^7$ centistokes at 25 degree, and consisting of 99.8% by moles of dimethyl siloxane units and 0.2% by moles of methyl vinyl siloxane units with vinyl dimethyl silyl groups as the molecular chain end-blocking groups, with 40 parts of a fumed silica filler having a specific surface area of 230 $m^2/g$ and hydrophobilized on the surface as blocked with trimethyl silyl groups and 1.0 part of an α,ω-dimethyl polysiloxane having a viscosity of about 20 centistokes at 25° C.

A 100 parts portion of this compound B was uniformly admixed with 3.5 parts of a pasty mixture containing 50% by weight of 2,4-dichlorobenzoyl peroxide. The peroxide-blended compound B was sheeted through a three-roller mill into thin sheets which were dissolved or dispersed in toluene to prepare a dispersion containing 25% by weight of the compound B in toluene. Six coating compositions No. 1 to No. 6 were prepared each by admixing 100 parts of this compound B with 5 parts of:

3-isocyanatopropyl trimethoxy silane for No. 1 in Example 1;
3-isocyanatopropyl triethoxy silane for No. 2 in Example 6;
vinyl tris(2-methoxyethyloxy) silane for No. 3 in Comparative Example 2;
3-glycidyloxypropyl trimethoxy silane for No. 4 in Comparative Example 3;
3-aminopropyl triethoxy silane for No. 5 in Comparative Example 4; and
3-methacryloxypropyl trimethoxy silane for No. 6 in Comparative Example 5.

A plain-woven nylon cloth having a weaving density of 18 counts/25 mm by 17 counts/25 mm was coated on one surface with one of the above prepared coating compositions in a coating thickness of 70 μm as dried and the rubbery coating layer was cured, after air-drying at 25° C. for 30 minutes, by heating at 180° C. for 7 minutes to examine the surface curability of the silicone rubber layer. Thus, two rubber-coated cloths were laid one on the other with the rubber-coated surfaces contacting with each other and kept standing at room temperature for 1 hour under a load of 500 gf/cm² followed by separation of the cloths by pulling to record the resistance against pulling apart. The results were that the cloths coated with the coating compositions No. 1 and No. 2 could readily be separated without substantial resistance since the cured rubber surface was absolutely free from tackiness while the cloths coated with the coating compositions No. 3 to No. 6 could be separated only by pulling with substantial force since the cured rubber surface had tackiness.

Further, the silicone rubber-coated nylon cloths, either as prepared or after aging for 7 days at 85° C. in an atmosphere of 95% relative humidity, were subjected to the test of the adhesive bonding strength between the cured rubber layer and the substrate cloth in the same manner as in Example 2. The results are shown in Table 2 below which also shows the solid content measured after drying for 1 hour at 150° C. and the viscosity of the coating compositions at 25° C.

EXAMPLE 7 AND COMPARATIVE EXAMPLE 6.

Coating compositions No. 7 (Example 7) and No. 8 (Comparative Example 6) were prepared by dissolving and dispersing, in 412 parts of toluene, a uniform blend composed of 100 parts of the compound B prepared in the preceding examples, 1.5 parts of a methyl hydrogen polysiloxane (KF 99, a product by Shin-Etsu Chemical

TABLE 2

| Coating composition | Solid content, % | Viscosity, poise | Adhesion of rubber layer, kgf/25 mm | |
|---|---|---|---|---|
| | | | As prepared | After aging |
| No. 1 | 26.5 | 165 | 9.0 | 8.5 |

TABLE 2-continued

| Coating composition | Solid content, % | Viscosity, poise | Adhesion of rubber layer, kgf/25 mm | |
|---|---|---|---|---|
| | | | As prepared | After aging |
| No. 2 | 26.8 | 162 | 10.0 | 9.5 |
| No. 3 | 25.9 | 132 | 0.5 | — |
| No. 4 | 26.6 | 163 | 2.0 | 0.5 |
| No. 5 | 27.2 | 356 | 2.5 | 1.5 |
| No. 6 | 26.1 | 155 | 2.0 | 0.5 |
| No. 7 | 20.5 | 95 | 10.5 | 10.5 |
| No. 8 | 20.3 | 93 | 0.5 | — |

Co.), 0.05 part of ethynyl cyclohexanol and 1.5 parts of 3-isocyanatopropyl trimethoxy silane for No. 7 or vinyl tris(2-methoxyethyloxy) silane for No. 8 with further addition of 0.05 part of a 2-ethylhexanol solution of chloroplatinic acid in a concentration of 1% by weight as platinum. These coating compositions contained about 20% by weight of the non-volatile matter.

Silicone rubber-coated nylon cloths were prepared using the above prepared coating compositions No. 7 and No. 8 and tested for the adhesive bonding of the cured silicone rubber layer in the same manner as in Example 2 to give the results shown in Table 2. The surface curing of the coating layer formed from the coating composition No. 7 was complete without tackiness while the surface of the rubber-coated cloth prepared from the coating composition No. 8 had tackiness.

EXAMPLE 8

An organopolysiloxane compound C was prepared, by uniformly blending in a mixer, 100 parts of a dimethylpolysiloxane having a viscosity of 10,000 centistokes at 25° C. and terminated at each molecular chain end with a dimethyl vinyl siloxy group and 20 parts of a fumed silica having a specific surface area of 200 m²/g and hydrophobilized on the surface by blocking with trimethyl silyl groups.

A curable organopolysiloxane composition was prepared by uniformly kneading 100 parts of the above prepared compound C, 2.0 parts of a methylhydrogenpolysiloxane (KF 99, supra), 0.1 part of ethynyl cyclohexanol and 3 parts of 3-isocyanatopropyl trimethoxy silane followed by further addition of 0.1 part of the same chloroplatinic acid solution as used in Example 7.

Adhesion tests of this curable composition were undertaken in the same manner as in Example 1 by using test panels of iron, polyester resin and nylon resin to give the results that the adhesive bonding strength was 9.5, 12.0 and 10.8 kgf/cm², respectively.

What is claimed is:

1. A silicone rubber-coated fabric web which comprises:
   (A) a fabric web; and
   (B) a layer of a silicone rubber cured and bonded to at least one surface of the fabric web, said rubber being a cured self-adhesive silicone rubber composition
which is a uniform blend comprising:
   (a) 100 parts by weight of an organopolysiloxane represented by the average unit formula $$R_a SiO_{(4-a)/2}$$ 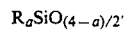

in which R is an unsubstituted or substituted monovalent hydrocarbon group and the subscript a is a positive number in the range from 1.98 to 2.01, and having a viscosity of at least 300 centistokes at 25° C.;

(b) from 0.1 to 20 parts by weight of an organosilane compound having, in a molecule, an isocyanato group —NCO and a hydrolyzable group represented by the formula $$R^1_b Si(OR^1)_{3-b}(R^2-NCO),$$

in which the group denoted by $R^1$ is a monovalent hydrocarbon group or an alkoxy-substituted alkyl group, the group denoted by $R^2$ is a divalent hydrocarbon group having 1 to 10 carbon atoms or an alkylene group having a sulfur atom between the carbon atoms forming a sulfide linkage and the subscript b is zero, 1 or 2, or a partial hydrolysis product thereof; and (c) a curing agent in an amount sufficient to cure the composition.

2. The web as claimed in claim 1 in which at least 50% by moles of the groups denoted by R in the component (a) are methyl groups.

3. The web as claimed in claim 1 in which the organopolysiloxane as the component (a) has a viscosity in the range from $1 \times 10^4$ to $1 \times 10^8$ centistokes at 25° C.

4. The web as claimed in claim 1 in which the organosilane compound as the component (b) is selected from the group consisting of the compounds expressed by the structural formulas $(MeO)_3Si(C_3H_6-NCO); (EtO)_3Si(C_3H_6-NCO);$ $(CH_2=CMe-O)_3Si(C_3H_6-NCO);$ $(MeOC_2H_4O)_3Si(C_3H_6-NCO);$
$(MeO)_2MeSi(C_3H_6-NCO);$ $(MeO)_2ViSi(C_3H_6-NCO);$
$(MeO)_2PhSi(C_3H_6-NCO);$ $(EtO)_2MeSi(C_3H_6-NCO);$
$(MeO)_3Si(C_2H_4-S-C_3H_6-NCO);$ and $(MeO)_2MeSi(C_2H_4-S-C_3H_6-NCO),$ in which Me, Et, Vi and Ph denote methyl, ethyl, vinyl and phenyl groups, respectively.

5. The web as claimed in claim 1 in which the curing agent is an organic peroxide.

6. The web as claimed in claim 5 in which the amount of the organic peroxide is in the range from 0.1 to 5 parts by weight per 100 parts by weight of the component (a).

7. The web as claimed in claim 1 in which the curing agent is a combination of an organohydrogenpolysiloxane and a platinum compound when the organopolysiloxane as the component (a) has at least two alkenyl groups bonded to the silicon atoms in a molecule.

8. A method for preparing a fabric web coated with a silicone rubber, comprising coating a fabric substrate with a composition comprising (a) 100 parts by weight of an organopolysiloxane represented by the average unit formula $$R_a SiO_{(4-a)/2},$$

in which R is an unsubstituted or substituted monovalent hydrocarbon group and the subscript is a positive number in the range from 1.98 to 2.01, and having a viscosity of at least 300 centistokes at 25° C.;

(b) from 0.1 to 20 parts by weight of an organosilane compound having, in a molecule, an isocyanato group —NCO and a hydrolyzable group represented by the general formula $$R^1_b Si(OR^1)_{3-b}(R^2-NCO),$$

in which the group denoted by $R^1$ is a monovalent hydrocarbon group or an alkoxy-substituted alkyl group, the group denoted by $R^2$ is a divalent hydrocarbon group having 1 to 10 carbon atoms or an alkylene group having a sulfur atom between the carbon atoms forming a sulfide linkage and the subscript b is zero, 1 or 2, or a partial hydrolysis product thereof;

(c) a curing agent in a amount sufficient to cure the composition; and curing said composition.

* * * * *